July 30, 1957
G. A. LAKATA
2,800,971
VEHICLE SUPPORT STAND
Filed Dec. 13, 1955
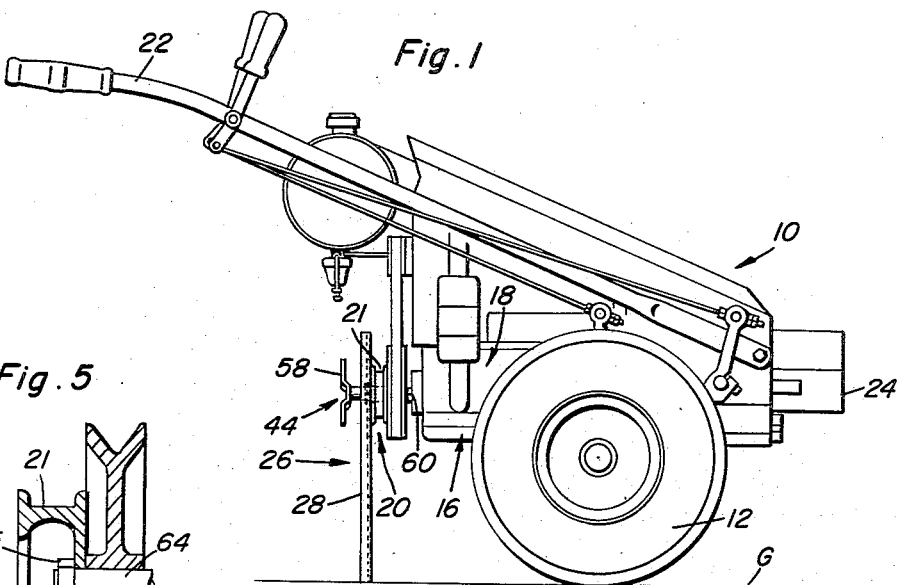
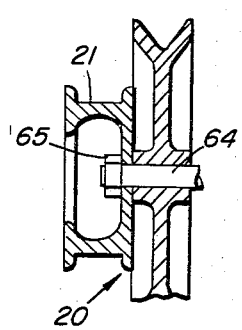
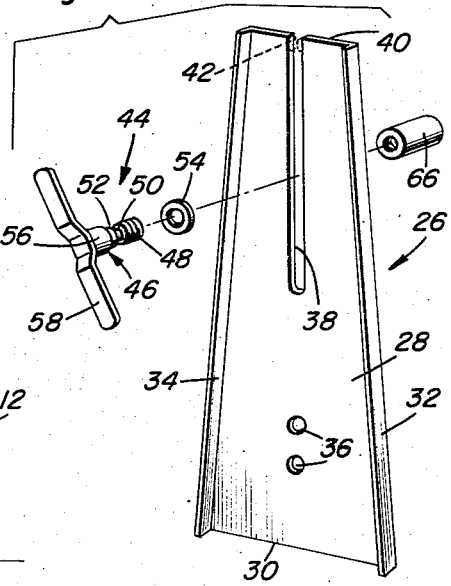
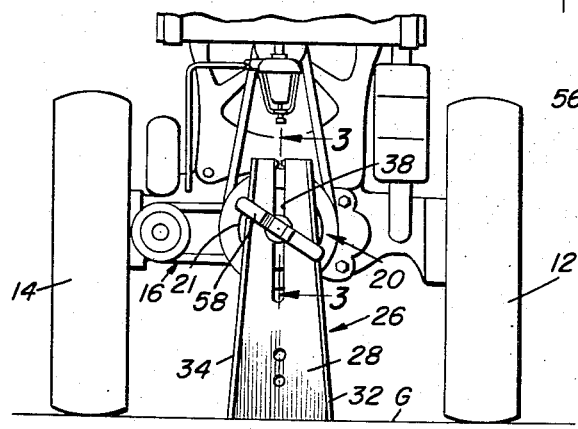
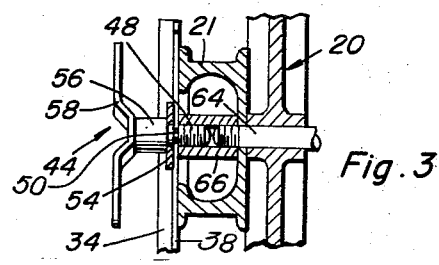
George A. Lakata
INVENTOR.

United States Patent Office 2,800,971
Patented July 30, 1957

2,800,971

VEHICLE SUPPORT STAND

George A. Lakata, Wallingford, Pa.

Application December 13, 1955, Serial No. 552,782

2 Claims. (Cl. 180—19)

This invention relates generally to attachments for hand manipulated two-wheel tractors and is more particularly concerned with a removable support stand attachment permitting the tractor to be readily stored and aiding in the installation and removal of various implement attachments for said tractor.

The attachment is generally usable with a conventional type of garden tractor which embodies a longitudinally disposed internal combustion engine mounted on a two-wheel chassis which is hand manipulated by means of a pair of "wheelbarrow" type handles and including a forwardly extending power shaft for driving implement attachments, and including a rearwardly disposed flywheel pulley for starting the internal combustion engine.

A primary object of the invention is to provide a vertical support stand attachment incorporating a longitudinal slot portion reciprocably and rotatably carrying a clamp screw which is engageable with an adapter sleeve securable in axial alignment on the support shaft of a flywheel pulley of the tractor engine.

A further object of the invention in conformance with that set forth above is to provide a support stand attachment of the character set forth which is readily adjustable to position the forward end of the tractor at various heights for accommodating the installation and removal of various implement attachments.

Another object of the invention in conformance with that set forth above is to provide a support stand attachment of the character set forth which is readily and economically manufactured, easily installed, and highly acceptable and usable for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a tractor with the support stand attachment thereon;

Figure 2 is a rear elevational view of the tractor and support stand attachment looking from left to right at Figure 1;

Figure 3 is an enlarged sectional view taken substantially on the line 3—3 of Figure 2;

Figure 4 is an exploded perspective view of the support stand attachment showing weld beads in the slot portions in dotted lines, said weld beads being applied to the support stand after the clamp screw has been inserted in said slot portion; and Figure 5 is an enlarged fragmentary vertical sectional view showing the starter pulley and flywheel pulley before the same is modified to accommodate the novel support stand attachment.

A garden tractor of the conventional type indicated is designated generally by the numeral 10, said garden tractor incorporating a chassis mounted on a pair of ground support wheels 12 and 14, the chassis being indicated generally at 16. The chassis supporting thereon an internal combustion engine indicated generally at 18, the engine 18 incorporating a flywheel pulley assembly 20 which includes a starter pulley 21 which is utilized generally for starting the internal combustion engine. The chassis includes a pair of rearwardly extending "wheelbarrow" type handles 22 (only one being shown) for manipulating the tractor. It is to be understood that the forward portion of the tractor incorporates universal connecting means for securing thereon various implement attachments such as reciprocating mowers, snow plow attachments, plowing attachments, etc.

The various mentioned implement attachments may be of varying height and accordingly it is necessary to manipulate the forward end portion 24 of the tractor to accommodate the same to the varoius heights whereby the implement attachments may be secured on the tractor. Furthermore, it may be necessary to remove the attachment from the tractor and store the tractor when not in use and, accordingly, a support stand attachment indicated generally at 26 is provided for this purpose.

The support stand attachment 26 incorporates a vertical support member 28 having a broad base portion 30 for engaging the ground surface indicated generally at G, the support member incorporating a substantially planar surface and including, if desirable, reinforcing flange portions 32 and 34. The support member may incorporate adjacent the lower end portion suitable aperture portions 36 for mounting the support plate on the tractor or hanging it in a work shop when not in use. The support member 28 includes therein a longitudinally extending slot portion 38, said slot portion 38 opening into the upper edge 40 of the support member and having a transverse weld bead 42 disposed thereacross adjacent the upper edge when a clamp screw assembly 44 has been mounted on the support member.

The clamp screw assembly 44 includes a screw element 46 incorporating a threaded end portion 48, an annular groove or slot portion 50 receivable in the slot portion 38 of the support member 28, a reduced diameter portion 52 which accommodates thereon a suitable washer element 54, and an abutment portion 56 which is of a larger diameter than the portion 52 and against which the washer element 54 is juxtaposed. The abutment portion 56 has suitably secured thereon a transversely disposed handle member 58 for rotating the screw element 46, and the screw clamp assembly 44 is mounted in the slot portion 38 of the support member with the washer element 54 disposed on the reduced diameter portion 52, and after such disposition in the slot portion 38 the weld beads 42 are applied to the support member whereby the screw clamp assembly is retained in the slot portion 38.

As most clearly seen in Figure 5, the starting pulley is conventionally mounted on the support shaft 60 of the internal combustion engine by means of a shaft portion 64 and retaining nut 65. An internally threaded adapter sleeve 66 replaces the nut 65, said adapter sleeve 66 threadedly receiving the threaded end 48 of the screw clamp assembly for the purpose of securing the support member 28 in various positions of adjustment relative to the longitudinal axis of the support shaft of the starter pulley. The sleeve 66 is of such a length that the support member 28 will be juxtaposed on the pulley 21 when the support stand attachment is mounted on the tractor, see Figure 3.

Thus for various implements of various heights wherein the front end of the tractor must be manipulated, the handle portion 22 of the tractor may be grasped in one hand and the handle 58 of the support stand attachment may be rotated, loosening the screw in the support sleeve 66 whereby the forward end of the tractor may be placed in a desired position of adjustment whereafter the clamp screw assembly 44 may be tightened to retain the tractor in the predetermined position of adjustment for the mounting or removal of an implement attachment on the tractor. The support stand 26 may be also utilized for supporting the tractor as seen in Figure 1 when the tractor is being stored and not in use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a two-wheel tractor for accommodating a plurality of implement attachments and including a rearwardly disposed starting pulley rotatably mounted on a longitudinally extending support shaft, a removable support stand assembly comprising a tubular internally threaded adapter sleeve threaded on said support shaft in longitudinal alignment therewith and extending rearwardly therefrom, an elongated planar support member including a lower ground engaging portion, a longitudinally extending slot portion extending through said support member, a transverse screw element slidably and rotatably received in the slot portion of the support member, said screw including an abutment portion at one end engageable with one side of the support member on opposite sides of said slot portion, the screw including a threaded end removably received in the adapter sleeve for clamping the support member between said sleeve and abutment portion of said screw, and means on said screw for rotating the same into and out of clamping engagement with the adapter sleeve.

2. In a two-wheel tractor as set forth in claim 1, wherein the starting pulley is secured on the tractor by means of the adapter sleeve, the screw element including a reduced diameter portion adjacent said abutment portion, a washer member supported on said reduced diameter portion, and an annular groove portion on the screw element between the reduced diameter portion and the threaded portion thereof, the annular groove of said screw element being slidably and rotatably received within the slot portion of said support member.

References Cited in the file of this patent

UNITED STATES PATENTS

| 1,913,721 | Pavelko | June 13, 1933 |
| 2,597,107 | Kelsey | May 20, 1952 |

FOREIGN PATENTS

| 1,081,774 | France | June 9, 1954 |